United States Patent [19]

Ohnuma

[11] 4,095,486
[45] Jun. 20, 1978

[54] DEVICE FOR CONTROLLING A LOCK-UP CLUTCH IN AN AUTOMATIC TRANSMISSION

[75] Inventor: Kiyoshi Ohnuma, Toyota, Japan

[73] Assignee: Toyota Jidosha Kogyo Kabushiki Kaisha, Toyota, Japan

[21] Appl. No.: 703,964

[22] Filed: Jul. 9, 1976

[30] Foreign Application Priority Data

Mar. 2, 1976 Japan .................................. 51/022521

[51] Int. Cl.² ...................... F16H 47/00; F16D 37/00
[52] U.S. Cl. ..................................... 74/645; 192/3.29; 74/731; 74/733
[58] Field of Search ...................... 192/3.28, 3.29, 3.3, 192/3.31, 3.32, 3.33; 74/732, 733, 645

[56] References Cited

U.S. PATENT DOCUMENTS

| 2,824,632 | 2/1958 | Lucia et al. | 192/3.3 |
| 3,059,740 | 10/1962 | Roche | 192/3.28 |
| 3,638,771 | 2/1972 | Chana | 192/3.33 |
| 3,705,642 | 12/1972 | Thompson | 74/645 UX |
| 3,719,093 | 3/1973 | Edmonds | 74/645 |

Primary Examiner—Benjamin W. Wyche
Assistant Examiner—Lance W. Chandler
Attorney, Agent, or Firm—Birch, Stewart, Kolasch & Birch

[57] ABSTRACT

A device for controlling a lock-up clutch incorporated in an automatic transmission together with a torque converter, wherein engagement and disengagement of the lock-up clutch are controlled by utilizing transitional variation characteristic of the oil pressure supplied to oil pressure servo means incorporated in the transmission.

10 Claims, 6 Drawing Figures

DEVICE FOR CONTROLLING A LOCK-UP CLUTCH IN AN AUTOMATIC TRANSMISSION

BACKGROUND OF THE INVENTION

1. Field of the Invention

The present invention relates to a transmission and, more particularly, a device for controlling operation of a lock-up clutch incorporated in an automatic transmission system having a torque converter.

2. Description of the Prior Art

An automatic transmission including a fluid torque converter and a lock-up clutch is, of course, know in the prior art. U.S. Pat. No. 3,255,642 apparently discloses an automatic transmission including a fluid torque converter and a lock-up clutch. In a transmission including a fluid torque converter and a lock-up clutch, it is required that the lock-up clutch is disengaged not only when the transmission is shifted in a low speed range, but also when the transmission is changed over between two different speed ranges. In the aforementioned U.S. patent, the temporary disengagement of the lock-up clutch during change-over between two speed ranges is effected by employing a pressure difference caused by a restricting orifice through which servo oil pressure is transmitted to individual clutches and/or brakes which effect a different power transmission route in a gear transmission. However, a system which depends upon the pressure difference across a restricting orifice means does not operate consistently because the operating characteristic varies largely in accordance with the viscosity of oil, i.e. the temperature thereof. In view of such a problem in the earlier prior art, U.S. patent application Ser. No. 634,040 filed on Nov. 21, 1975, and assigned to the same assignee as the present application, was directed to employing a change-over valve composite adapted to be actuated by a plurality of control fluid pressures generated by a transmission control system so as to control the supply of a selected one of the control fluid pressures to an actuating port of a lock-up clutch control valve depending upon a balance among the plurality of control fluid pressures.

SUMMARY OF THE INVENTION

The primary object of the present invention is to control the operation of the lock-up clutch in an automatic transmission which includes a fluid torque converter with a lock-up clutch and a gear transmission actuated by an oil pressure the servo system by utilizing oil pressure variations in servo chambers of said oil pressure servo system.

In accordance with the present invention, the lock-up clutch is disengaged in the forward 1st speed transmission range and engaged in the 2nd and 3rd speed ranges in order to improve fuel consumption. Furthermore, the lock-up clutch is temporarily disengaged when the transmission is shifted between the 1-2, 2-3 and 3-2 speed ranges by utilizing pressure variations in the oil pressure servo chambers in order to reduce shocks caused by the changing-over of the transmission, the lock-up clutch being again engaged after the completion of the changing-over operation.

Another object of the present invention is to control the transmission so that the operation of the lock-up clutch is effected only when the vehicle speed is above a predetermined level.

Still another object of the present invention is to provide a control system which effects the operation of the lock-up clutch above different automobile speeds in the 2nd speed and 3rd speed ranges.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
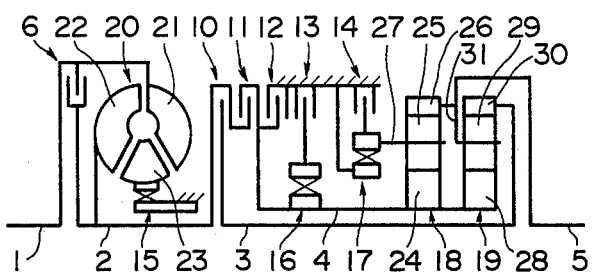
FIG. 1 is a diagrammatical view showing a power transmission mechanism in an automatic transmission in which the present invention is incorporated.

Turning now to FIG. 1, the transmission shown herein includes an engine output shaft 1, a fluid torque converter 20, an input shaft of a gear transmission mechanism 2, intermediate shafts 3 and 4, planetary gear mechanisms 18 and 19, output shaft 5, two clutches 10 and 11, three brakes 12, 13 and 14, three one-way clutches 15, 16 and 17 and a lock-up clutch 6 incorporated in the torque converter 20. The torque convertor 20 comprises a pump impeller 21, a turbine runner 22 and a stator 23 supported by the one-way clutch 15, wherein the stator adjusts the direction of outflow from the turbine before it enters into the pump impeller so as to produce a larger torque output in the turbine runner than in the pump impeller as a larger speed difference exists between the pump impeller and the turbine runner. The torque converter 20 also incorporates therein the lock-up clutch 6 which directly connects the engine output shaft 1 and the input shaft 2 of the gear transmission. The planetary gear mechanisms 18, 19 comprise, respectively sun gears 24, 28, planetary pinions 25, 29, ring gears 26, 30, carriers 27, 31. The power output shaft 1 of the engine is connected with the pump impeller 21 of the torque converter 20, while the power input shaft 2 of the gear transmission is connected with the turbine runner 22 of the torque converter. The input shaft is selectively connected with the intermediate shaft 3 by way of the clutch 10 and with the intermediate shaft 4 by way of the clutch 11, respectively. The intermediate shaft 3 is connected with the ring gear 30 of the planetary gear mechanism 19, while the intermediate shaft 4 is connected with the sun gears 24 and 28 of the planetary gear mechanisms 18 and 19, respectively, and furthermore, the shaft is also laid under the control of the brake 12 by way of the one-way clutch 16. The output shaft 5 of the gear transmission is connected with the ring gear 26 of the planetary gear mechanism 18 and is also connected with the carrier 31 of the planetary gear mechanism 19. The carrier 27 of the planetary gear mechanism 18 is laid under the control of the brake 14 and the one-way clutch 17.

The operation of the aforementioned automatic transmission system is summarized in the following Table 1 in connection with operations of the clutches 10, 11, brakes 12, 13, 14 and one-way clutches 16, 17:

TABLE 1

| Shift Ranges | 10 | 11 | 12 | 13 | 14 | 16 | 17 |
|---|---|---|---|---|---|---|---|
| 1st Speed | 0 | | | | Δ | | * |
| 2nd Speed | 0 | | Δ | 0 | | * | |
| 3rd Speed | 0 | 0 | | 0 | | | |
| Reverse | | 0 | | | 0 | | |

In Table 1, marks "0" indicate that the corresponding clutches or brakes are actuated or engaged. Marks "Δ" indicate that the corresponding brakes are actuated when the engine braking is effected. Marks "*" indicate that the one-way clutches are locked only when the engine effects positive driving.

Figure 2:
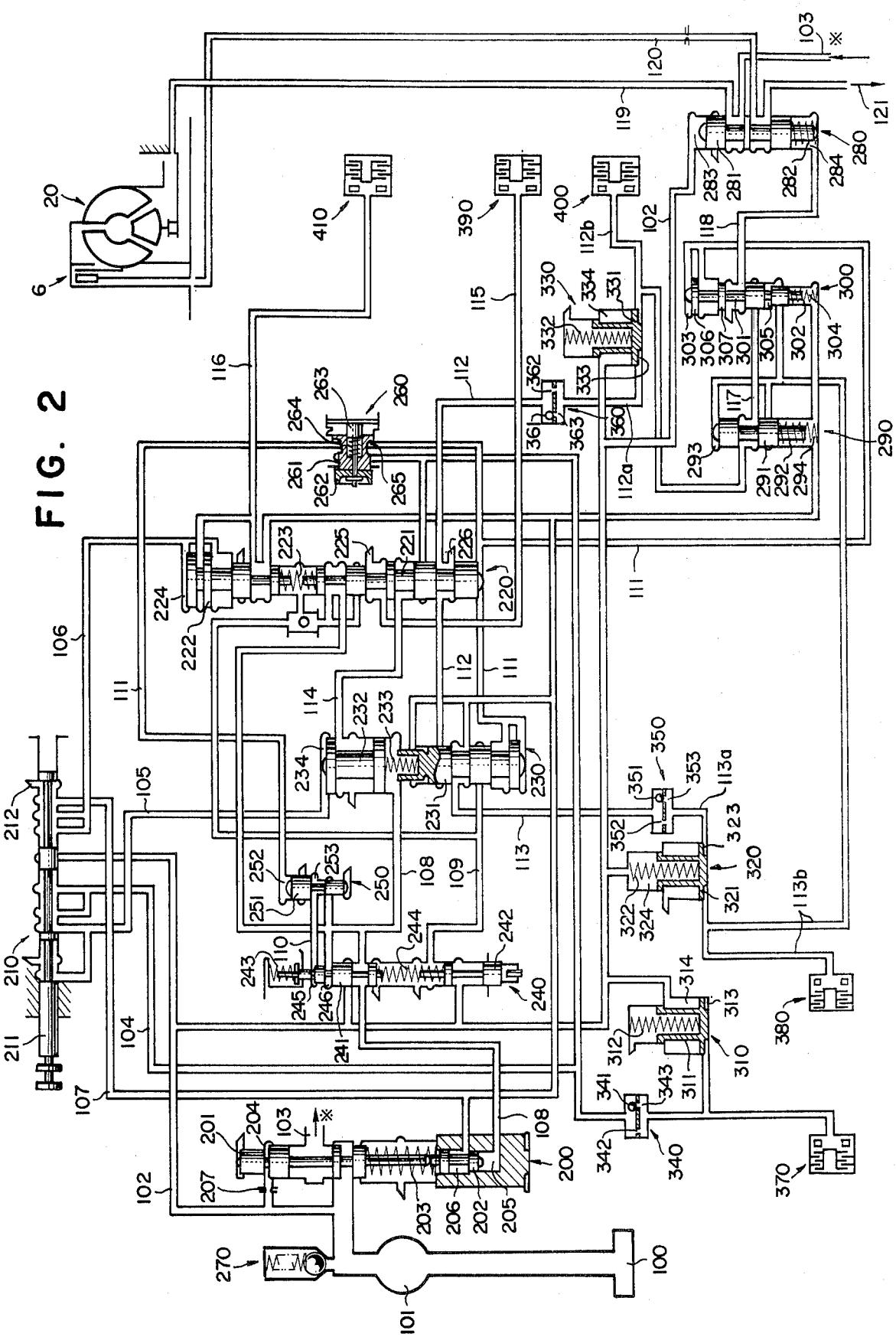
FIG. 2 is a diagram showing an oil pressure circuit as an embodiment of the control device according to the present invention; and, FIGS. 3, 4, 5 and 6 are graphs showing variations of oil pressure supplied to clutches and brakes during change-over between different speed ranges, the performance of the oil pressure representing the performance of accumulators.

Reference is now made to FIG. 2 showing an embodiment of the oil pressure control system of the invention. The system comprises an oil reservoir 100, an oil pump 101, various kinds of valves such as pressure regulating valve 200, speed shift valves 210, 1-2 shift valves 220, 2-3 shift valves 230, throttle valves 240, cut back valves 250, governor valves 260, relief valves 270, lock-up shift valves 280, 2-3 relay valves 290, lock-up shift control valve 300 and check valves 340, 350, 360, accumulators 310, 320, 330, oil pressure cylinders 370, 380, 390, 400, 410 which actuate clutches 10, 11 and brakes 12, 13, 14, respectively, and oil passages interconnecting these operational elements.

The operation of the oil pressure control system will be explained hereinunder:

The source of oil for the torque converter 20 and other various lubrication systems is the oil pump 101 which is directly driven by the engine and delivers oil pumped up from the reservoir 100 to the oil passage 102. The oil pressure in the passage 102 is the source of all operating oil pressure in the system and is called "line pressure". The line pressure is regulated at a predetermined pressure level by the pressure regulating valve 200 as explained hereinbelow. The relief valve 270 relieves the line pressure when it has arisen beyond a normal level. An oil pressure is supplied from the pressure regulating valve 200 through a passage 103 to the torque converter 20 and various lubricating locations. The speed shift valve 210 comprises a spool 211 moved in accordance with the handling of a driver's lever so as to supply the line pressure in the passage 102 to passages 104, 105, 106, and 107 in accordance with the shift position of the driver's lever, as summarized in Table 2.

TABLE 2

| Shift Positions | passage 104 | passage 105 | passage 106 | passage 107 |
|---|---|---|---|---|
| R-Position | — | — | 0 | 0 |
| N-Position | — | — | — | — |
| D-Position | 0 | — | — | — |
| 2-Position | 0 | 0 | — | — |
| L-Position | 0 | 0 | 0 | — |

Marks "0" in Table 2 indicate that the line pressure is supplied to the corresponding passages, while marks "-" indicate that the line pressure is not supplied to the corresponding passages. In the table, R-Position means reversing, N-Position means neutral, D-Position means forward 3 speed automatic transmission, 2-Position means automatic transmission between forward 1st speed and 2nd speed, and L-Position means fixing to forward 1st speed range.

In D-Position, the line pressure is supplied from passage 104 through check valve 340 and accumulator 310 to the oil pressure cylinder 370, whereby the clutch 10 is engaged. The passage 104 also supplies the line pressure to 1-2 shift valve 220 and governor valve 260. The 1-2 shift valve 220 comprises spools 221, 222 and a spring 223, wherein the spool 221 is shifted downward in 1st speed range thereby intercepting the line pressure from passage 104 toward any passages. In 2nd and 3rd speed ranges, the spool 221 is shifted upward by the governor pressure supplied through passage 111, whereupon it conducts the line pressure from passage 104 to passage 112. The passage 112 communicates to 2-3 shift valve 230 and also to oil pressure cylinder 400 of the brake 13, whereby the brake 13 is actuated. When the brake 13 is actuated, the transmission operates in the 2nd speed range as seen in Table 1. The 2-3 shift valve 230 comprises spools 231, 232 and a spring 233, wherein the spool 231 is shifted downward in 1st and 2nd speed ranges while in 3rd speed range the spool 231 is shifted upward by the governor pressure from passage 111 thereby conducting the line pressure from passage 112 to passage 113 which further conducts the pressure to oil pressure cylinder 380 of the clutch 11 which is then actuated. Upon engagement of the clutch 11, the transmission operates in the 3rd speed range, as seen in Table 1.

In 2-Position, the line pressure is supplied to passages 104 and 105. The line pressure supplied to the passage 105 is introduced into a chamber 234 of the 2-3 shift valve 230 thereby holding the spools 231, 232 downward, while the pressure is also conducted through passage 114. When the 1-2 shift valve 220 is not in 1st speed range, the passage 114 communicates to a passage 115 through the 1-2 shift valve 220 thereby supplying the line pressure to oil pressure cylinder 390 of the brake 12 which is then actuated. The line pressure in the passage 104 is supplied to oil pressure cylinder 370 of the clutch 10 and is also conducted through 1-2 shift valve 220 and passage 112 to oil pressure cylinder 400 of the brake 13. Thus, the clutch 10 and the brake 13 are actuated. When the brake 12 is actuated, the sun gears 24 and 28 of the planetary gear mechanisms 18 and 19 are braked from rotation in either direction, whereby the engine brake is effected. Upon engagement of the clutch 10 and brakes 12 and 13, the transmission operates in the 2nd speed range as seen in Table 1. When the 1-2 shift valve 220 is shifted to 1st speed range, i.e. the spool 221 is shifted downward, the passage 115 communicates to an exhaust passage 225, whereby the brake 12 is released, and, simultaneously, the passage 112 is connected to an exhaust passage 226 whereby the brake 13 is also released. Thus, the transmission is brought to the 1st speed condition.

In L-Position, the line pressure is supplied to passages 104, 105 and 106. The line pressure supplied to the passage 104 actuates the clutch 10 in the same manner as in individual speed ranges effected under D-Position. The line pressure supplied to the passage 105 holds spools 231 and 232 of 2-3 shift valve 230 in the downward shifted position. The line pressure supplied to passage 106 is applied to chamber 224 of the 1-2 shift valve 220 thereby holding spools 221 and 222 in the downward shifted position. The line pressure is further transmitted therefrom through passage 116 to oil pressure chamber 410 of the brake 14 which is then actuated. When the brake 14 is actuated, the carrier 27 of the planetary gear mechanism is braked from rotating in either direction thereby effecting the engine brake. Thus, upon actuation of the clutch 10 and brake 14, the transmission operates in the 1st speed range, as indicated in Table 1.

In R-Position, the line pressure is supplied to passages 106 and 107. The line pressure supplied to the passage 107 is conducted to chamber 206 of the line pressure regulating valve 200 and operates to increase the line pressure. The line pressure is further conducted through 2-3 shift valve 230 and passage 113 to oil pressure cylinder 380 of the clutch 11 which is then actuated. Simultaneously, the line pressure in the passage 107 is conducted through 1-2 shift valve 220 and passage 116 to oil pressure cylinder 410 of the brake 14 which is then actuated. Therefore, the clutch 11 and brake 14 are actuated, whereby the transmission is put into reverse range as indicated in Table 1.

The governor valve 260 comprises a governor valve element 261, governor weight 262, governor shaft 263, spring 264 and oil chamber 265. The governor valve is mounted to the output shaft 5 in FIG. 1. The governor valve produces an oil pressure called "governor pressure" in passage 111 depending upon a balance among the centrifugal force generated by the mass of the governor weight 262, governor shaft 263 and spring 264, the spring force exerted by the spring 264 and the oil pressure supplied to the oil chamber 265, said governor pressure increasing in accordance with or generally in proportion to the rotational speed of the output shaft.

The throttle valve 240 comprises a spool 241, downshift plug 242, springs 243, 244 and oil chambers 245, 246 and produces a throttle pressure in passage 108 depending upon a balance between the spring force exerted by the spring 244 in accordance with movement of the downshift plug 242 and the oil pressures supplied to the chambers 245 and 246, said throttle pressure increasing in proportion to the throttle opening. The throttle pressure in the passage 108 is supplied to 1-2 shift valve 220 and 2-3 shift valve 230 to control changing-over of the transmission in accordance with engine load. When the accelerating pedal is strongly depressed to effect the kick-down, the downshift plug 242 moves upward so far as to connect passage 102 to passage 109. The line pressure is then conducted through the passage 109 to 1-2 shift valve 220 and 2-3 shift valve 230 thereby applying downward pressure to the spools 221 and 231 which are then shifted from the 3rd speed position to the 2nd speed position or from the 2nd speed position to the 1st speed position depending upon a balance between the pressure and the governor pressure applied to the lower end of the spools.

The cutback valve 250 comprises a spool 251 and chambers 252, 253 and produces a cutback pressure in passage 110 depending upon a balance between oil pressures supplied to the chambers 252 and 253. The cutback pressure in the passage 110 affects the throttle valve 240 to lower the throttle pressure thereby reducing a loss of power uselessly consumed by the oil pump. The pressure regulating valve 200 comprises spools 201, 202, spring 203, chambers 204, 205, 206 and an orifice 207 provided at the entrance of the chamber 204 and produces the line pressure in the passage 102 depending upon a balance among oil pressures existing in the chambers 204, 205 and 206 and the force of the spring 203.

Figure 3:
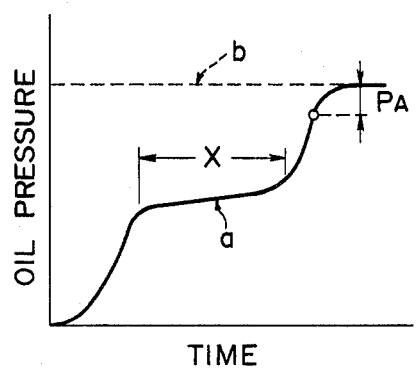
Figure 4:
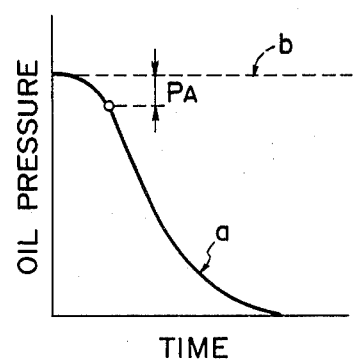
Figure 5:
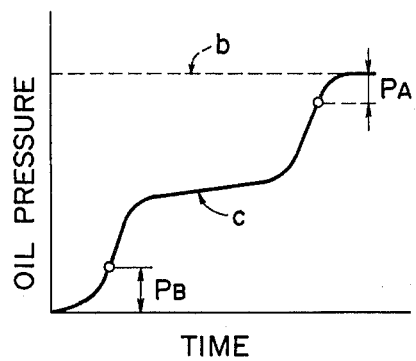
Figure 6:
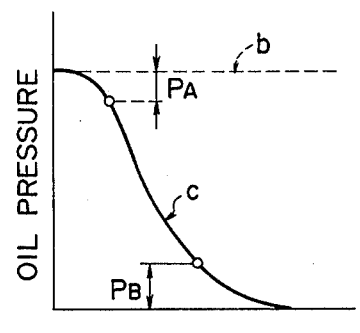

Check valves 340, 350 and 360 comprise check balls 341, 351 and 361, small orifices 342, 352 and 362 and large orifices 343, 353 and 363, respectively. Accumulators 310, 320 and 330 comprise pistons 311, 321 and 331, springs 312, 322 and 332, operating chambers 313, 323 and 333 and back pressure chambers 314, 324 and 334, respectively, and control oil pressure supplied to oil pressure cylinders 370, 380 and 400 of clutches 10 and 11 and brake 13, respectively, so as to reduce shock at the instant of engagement of the clutches or brake. FIGS. 3-6 show the change of oil pressure obtained from operation of the accumulators. FIGS. 3 and 4 show operation of the accumulator 330, wherein FIG. 3 shows the change of oil pressure during engagement of the brake 13 and FIG. 4 shows the change of oil pressure during disengagement of the brake 13. In these figures solid lines $a$ show the change of oil pressure in passage 112b while broken lines $b$ show the oil pressure in the passage 102. FIGS. 5 and 6 show operation of the accumulator 320, wherein FIG. 5 shows the change of oil pressure during engagement of the clutch 11 and FIG. 6 shows the change of oil pressure during disengagement of the clutch 11. Solid lines $c$ show the change of oil pressure in passage 113b and broken lines $b$ show the oil pressure in the passage 112.

Operation of the accumulators will be explained with regard to accumulator 330 with reference to FIGS. 2 and 3. When oil pressure is supplied in passage 112, the oil pressure is conducted through the small orifice 362 of the check valve 360 to passage 112a. The oil pressure conducted through the passage 112a is supplied to chamber 333 of the accumulator 330, said pressure urging the piston 331 upward against the line pressure applied to the chamber 334 and the force of spring 332. Therefore, the oil pressure in chamber 333 gradually increases as indicated by the solid line $a$ in FIG. 3 until it finally reaches the same pressure as the line pressure in passage 112. The width X in FIG. 3 shows the area in which the piston 331 moves.

The control circuit for the lock-up clutch 6 in the torque converter 20 will now be explained.

The lock-up shift valve 280 comprises a spool 281, spring 282 and chambers 283, 284, wherein the chamber 283 is constantly supplied with the line pressure. When the difference between the oil pressure in the chamber 284 and the line pressure is larger than a predetermined pressure difference $P_A$, the spool 281 is shifted downward by the line pressure existing in the chamber 283 thereby connecting passage 103 to passage 119. The oil pressure supplied from the passage 103 is circulated through passage 119 and the torque converter 20 to return through passage 120 toward an exhaust passage 121 while disengaging the lock-up clutch 6. When the difference between the oil pressures acting in the chambers 284 and 283 has become smaller than the difference value $P_A$, the spool 281 is shifted upward thereby connecting passage 103 to passage 103 to passage 120. Then, the oil pressure in passage 103 is supplied through passage 120 to the lock-up clutch 6 which is now engaged.

The 2-3 relay valve 290 comprises a spool 291, spring 292 and chambers 293, 294. When the oil pressure acting in the chamber 293 is below a predetermined value $P_B$, the spool 291 is shifted upward by the force of spring 292 thereby connecting passage 112b to passage 117. When the oil pressure acting in the chamber 293 has arisen beyond the value $P_B$, the spool 291 is shifted downward against the force of spring 292, thereby connecting passage 113b to passage 117. In the reverse range, wherein oil pressure is supplied to the chamber 294, the spool 291 is maintained in its upward shifted position.

The lock-up shift control valve 300 comprises a spool 301, spring 302 and chambers 303, 304. When the governor pressure supplied to the chamber 303 is below a predetermined value $P_1$, the spool 301 is shifted upward by the force of spring 302 thereby blocking the passage 117. When the governor pressure acting in the chamber 303 has increased beyond the value $P_1$, the spool 301 is shifted downward against the force of spring 302 thereby connecting passage 117 to passage 118. In the reverse range, wherein oil pressure is supplied in the chamber 304, the spool 301 is maintained in its upward shifted position.

Furthermore, since a land portion 306 has a larger diameter than a land portion 307, when the spool 301 is shifted in the upper position, the governor pressure supplied from passage 111 acts on area A of the land portion 307 but when the spool 301 is shifted in the lower position, the governor pressure acts on area B of the land portion 306. Therefore, the governor pressure $P_2$ which is the limit to allow the spool to move upward in lower than the governor pressure $P_1$ which is the limit to drive the spool downward by the ratio of A/B, thus giving a hysterisis effect to the shifting operation of the lock-up shift control valve.

The passage 113b communicates to a chamber 305 of the lock-up shift control valve 300. Therefore, the chamber 305 is supplied with oil pressure from the passage 113b in forward 3rd speed range, thereby applying upward driving force to the spool 301. Consequently, the governor pressure $P_1$, acting in the chamber 303 when the spool 301 is shifted downward in the 3rd speed range is larger than the governor pressure $P_1$ in the 2nd speed range.

In the forward 1st speed range, passages 112 and 113 are not supplied with oil pressure and, accordingly, oil pressure does not exist in chamber 284 of the lock-up shift valve 280. Consequently, the spool 281 is maintained in the lower position by the line pressure acting in chamber 283 thereby connecting passage 103 to passage 119. Then the oil pressure supplied from passage 103 is conducted through passage 119 to the torque converter 20 and, after having traversed the torque converter while maintaining the lock-up clutch 6 disengaged, the oil pressure is discharged through passage 120, lock-up clutch shift valve 280 and exhaust passage 121. Therefore, in the forward 1st speed range, the lock-up clutch 6 is disengaged.

In the 1-2 upshift, when the vehicle speed has increased in the forward 1st speed range (lock-up clutch 6 being disengaged) to a certain speed the spool 221 of the 1-2 shift valve 220 is shifted upward thereby supplying oil pressure in passage 112, the pressure is gradually transmitted through the orifice 362 of the check valve 360, passage 112a and accumulator 330 to passage 112b. The passage 112b communicates to the oil pressure cylinder 400 and the 2-3 relay valve 290. Since oil pressure does not exist in chamber 293 of the 2-3 relay valve 290, the spool 291 is shifted upward by spring 292 thereby connecting passage 112b to passage 117. The passage 117 communicates to the lock-up shift control valve 300. The spool 301 of the lock-up shift control valve 300 is laid under the control of the governor pressure acting in the chamber 303 so that the spool is shifted upward by spring 302 when the governor pressure is below the predetermined value $P_1$ while the spool is shifted downward against the force of spring 302 when the governor pressure has increased beyond the value $P_1$ thereby connecting oil passage 117 to passage 118. The passage 118 communicates to the chamber 284 of the lock-up shift valve 280. When the oil pressure in the passage 112b has gradually increased to be above a predetermined value, the piston in the oil pressure cylinder 400 is actuated to engage the brake 13. When the pressure in the passage 112b has further increased to a certain pressure where the difference between the pressure and the line pressure acting in the chamber 283 becomes smaller than the predetermined value $P_A$, and if the governor pressure in passage 111 has also reached the predetermined value $P_1$, the oil pressure in passage 112b is supplied to the chamber 284 of the lock-up shift valve 280 thereby driving the spool 281 upward thereby connecting passages 103 and 120. Then, the oil pressure in the passage 103 is supplied to passage 120, thus putting the lock-up clutch 6 into engagement. Therefore, in the 1-2 upshift, the brake 13 is engaged while the lock-up clutch 6 is disengaged and after the completion of the 1-2 upshift, the lock-up clutch 6 is engaged.

In the 2-3 upshift, when the vehicle speed has further increased in the forward 2nd speed range (lock-up clutch 6 being engaged) to a certain speed where the spool 231 of the 2-3 shift valve 330 is shifted upward thereby supplying oil pressure in passage 113, the oil pressure is gradually transmitted therefrom through orifice 352 of the check valve 350, passage 113a and accumulator 320 to passage 113b. The passage 113b communicates to the oil pressure cylinder 380 and also to the 2-3 relay valve 290 and the lock-up shift control valve 300. When the oil pressure in the passage 113b has gradually increased to reach the predetermined value $P_B$, the spool 291 of the 2-3 relay valve 290 is shifted downward thereby connecting passage 113b to passage 117 while intercepting passage 112b. up to the moment, the oil pressure in the passage 113b is smaller than that in the passage 112b and, consequently, the oil pressure in the chamber 284 of the lock-up shift valve 280 lowered due to relief of pressure through passage 118, lockup shift control valve 300, passage 117 and the 2-3 relay valve 290 until it becomes equal to the pressure in the passage 113b. At the moment the difference between the oil pressure acting in the chamber 284 and the line pressure acting in the chamber 283 is larger than the predetermined value $P_A$ and, accordingly, the spool 281 is shifted downward thereby connecting passage 113 to passage 119 resulting in disengagement of the lock-up clutch 6. When the oil pressure in the passage 113b has further increased. The piston in the oil pressure cylinder 380 is actuated to engage the clutch 11 thereby accomplishing the 3rd speed range. When the oil pressure in the passage 113b has further increased so far that the difference between the pressure and the line pressure in the chamber 283 becomes smaller than the predetermined value $P_A$, the spool 281 of the lock-up shift valve 280 is shifted upward thereby connecting passage 103 to passage 120, whereby the lock-up clutch 6 is engaged. Therefore, in the 2-3 upshift, the clutch 11 is engaged while the lock-up clutch 6 is disengaged and, after the completion of the 2-3 upshift, the lock-up clutch 6 is again engaged.

In the 3-2 downshift, when the vehicle speed has decreased in the forward 3rd speed range (lock-up clutch 6 being engaged), the spool 231 of the 2-3 shift valve 230 is shifted downward thereby connecting passages 113 and 107. Then, the oil pressure in the oil pressure cylinder 380 and the oil pressure in the chamber 284 of the lock-up shift valve 280 are gradually exhausted through passages 113b, 113a, check valve 350, passages 113, 107 and exhaust port 212 of the speed shift valve 210. When the oil pressure in the chamber 284 of the lock-up shift valve 280 has lowered to a certain pressure where the difference between the pressure and the line pressure acting in the chamber 283 becomes larger than the predetermined value $P_A$, the spool 281 is shifted downward thereby connecting passage 103 to passage 119, thus disengaging the lock-up clutch 6. When the oil pressure in the passage 113b has further lowered with the lock-up clutch 6 being disengaged, the clutch 11 is disengaged thereby establishing the 2nd speed range. When the oil pressure in the passage 113b has further lowered to be lower than the predetermined value $P_B$, the spool 291 of the 2-3 relay valve 290 is shifted upward thereby disconnecting passage 117 from passage 113b while connecting passages 112b and 117. Then, the oil pressure in the passage 112b is supplied through passages 117 and 118 to the chamber 284 of the lock-up shift valve 280. Since the oil pressure in the passage 112b acting in the chamber 284 is high and the difference between the pressure and the line pressure acting in the chamber 283 is smaller than the predetermined value $P_A$, the spool 281 is shifted upward thereby connecting passage 103 to passage 120 thus effecting engagement of the lock-up clutch 6. Therefore, in the 3-2 downshift, the clutch 11 is disengaged while the lock-up clutch 6 is disengaged and after the completion of the 3-2 downshift, the lock-up clutch 6 is again engaged.

In the 2-1 downshift, when the vehicle speed has further decreased in the forward 2nd speed range (lock-up clutch 6 being engaged) the spool 221 of the 1-2 shift valve 220 is shifted downward thereby connecting passages 112 and 226. Consequently, the oil pressure in the oil pressure cyclinder 400 and the chamber 284 of the lock-up shift valve 280 is gradually exhausted through passages 118, 117, 112b, 112a, check valve 360, passage 112 and exhaust passage 226. When the oil pressure in the chamber 284 of the lock-up shift valve 280 has lowered so far that the difference between the pressure and the line pressure acting in the chamber 283 becomes larger than the predetermined value $P_A$, the spool 281 is shifted downward, thereby connecting passage 103 to passage 119, thus disengaging the lock-up clutch 6. When the oil pressure in the passage 112b has further lowered with the lock-up clutch 6 being disengaged, the brake 13 is disengaged thereby establishing the forward 1st speed range.

From the foregoing, it will be understood that the system of the present invention controls engagement and disengagement of the lock-up clutch by utilizing the change of pressure in the oil pressure servo means of the automatic transmission incorporating a gear transmission, a torque converter and a lock-up clutch. In accordance with the present invention, the lock-up clutch is disengaged in the forward 1st speed range while it is engaged in the 2nd and 3rd speed ranges. Furthermore, the lock-up clutch is temporarily disengaged in the 1-2, 2-3 and 3-2 shifting, whereby engagement or disengagement of the oil pressure servo means in the gear transmission is effected while the lock-up clutch is disengaged and, after the completion of engagement or disengagement of the servo means, the lock-up clutch is against engaged. By this arrangement, shocks due to shifting of the transmission are avoided and the fuel consumption is improved by effecting direct power transmission from the engine to the output shaft of the transmission over as wide a range of operation as possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A device for controlling a lock-up clutch in an automatic transmission including a torque converter equipped with a lock-up clutch, comprising:
    first and second oil pressure passage means which supply first and second oil pressures to first and second oil pressure servo means, respectively;
    a relay valve which is controlled by said second pressure and delivers said first pressure as an output pressure when said second pressure is below a first predetermined value and delivers said second pressure as an output pressure when said second pressure is above said first predetermined value; and
    a lock-up shift valve which is shifted by a balance of said output pressure of said relay valve and line pressure and changes over the supply of oil pressure to engage said lock-up clutch when the difference between the output pressure and the line pressure is smaller than a second predetermined value and to disengage said lock-up clutch when said difference of pressure is larger than said second predetermined value.

2. The device of claim 1, further comprising a lock-up shift control valve disposed between said relay valve and said lock-up shift valve, said lock-up shift control valve being controlled by governor pressure varying as a function of the vehicle speed to open to transmit oil pressure therethrough when the governor pressure is above a predetermined value.

3. The device of claim 1, wherein said first and second oil pressure passage means comprise orifices and accumulators, the latter being provided downstream of the former, said relay valve being supplied with oil pressure downstream of said orifices.

4. The device of claim 1, wherein said transmission includes a gear transmission which provides forward 1st, 2nd and 3rd speed ranges and reverse range in accordance with engagement or disengagement of a plurality of oil pressure servo means including said first and second oil pressure servo means incorporated therein, said first oil pressure servo means being engaged to provide said 2nd and 3rd speed ranges, said second oil pressure servo means being engaged to provide said 3rd speed and reverse ranges.

5. The device of claim 4, wherein said relay valve comprises a housing having first, second, third, fourth and fifth ports, a spool having first and second opposite ends and first and second land portions and a spring which biases said spool toward said first end, said second port being supplied with said first oil pressure while said first and fourth ports being supplied with said second oil pressure, said third port providing said output pressure, said fifth port being supplied with the line pressure in the 1st speed and reverse ranges, said first end of said spool being constantly exposed to said first port while said second end of said spool being constantly exposed to said fifth port, said first and second land portions controlling connections among said second, third and fourth ports in a manner that when said spool is shifted toward said first end, said second and third ports are connected with each other while said fourth port is intercepted and when said spool is shifted toward said second end, said third and fourth ports are connected with each other while said second port is intercepted.

6. The device of claim 2, wherein said lock-up shift control valve incorporates therein a hysteresis structure comprising a spool having first and second land portions of different diameters cooperating with first and second cylinder bores of different diameters, said first land portion effectively receiving the governor pressure when said spool is shifted in a first shift position while said second land portion effectively receiving said governor pressure when said spool is shifted in a second shift position.

7. The device of claim 6, wherein said spool is selectively supplied with an additional biasing force toward said second shift position in 1st speed and reverse ranges of the transmission.

8. The device of claim 3, further comprising check valves arranged in parallel with said orifices.

9. A device for controlling a lock-up clutch in an automatic transmission including a gear transmission, oil pressure servo means for controlling operation of said gear transmission, a torque converter, a lock-up clutch and an oil pressure control system which controls operation of said oil pressure servo means and said torque converter, said system including first and second oil pressure servo means, first and second oil pressure passage means which supply first and second oil pressures to said first and second oil pressure servo means, respectively, said first oil pressure servo means being supplied with said first oil pressure in first and second speed ranges while said second oil pressure servo means being supplied with said second oil pressure in said second speed range, a relay valve which is shifted between first and second shift positions depending upon a balance between said second oil pressure and a spring force in a manner that it is shifted in said first shift position when said second pressure is below a first predetermined value to deliver said second pressure as an output pressure thereof while it is shifted in said second shift position when said second pressure is above said first predetermined value to deliver said second pressure as an output pressure thereof, a lock-up shift valve which is shifted between first and second shift positions depending upon a balance between line pressure and said output pressure of said relay valve in a manner that it is shifted in a first shift position when the difference between said line pressure and said output pressure is smaller than a second predetermined value while it is shifted in a second shift position when said difference is larger than said second predetermined value, said lock-up shift valve changing over the direction of pressure oil flow through said torque converter and said lock-up clutch so as to engage said lock-up clutch when it is shifted in said first shift position while disengaging said lock-up clutch when it is shifted in said second shift position, restricting orifices and accumulators provided in said first and second oil pressure passage means, said relay valve being supplied with said first and second oil pressures downstream of said orifices and accumulators.

10. The device of claim 9, further comprising a lock-up shift control valve disposed in the middle portion of a passage which supplies said output pressure of said relay valve to said lock-up shift valve, said lock-up shift control valve having a valve element actuated by governor pressure which varies as a function of the vehicle speed, said valve element intercepting said passage conducting said output pressure of said relay valve when the governor pressure is below a predetermined value.

* * * * *